(12) United States Patent
Xu et al.

(10) Patent No.: US 10,946,316 B2
(45) Date of Patent: Mar. 16, 2021

(54) FILTER CARTRIDGE HAVING DOUBLE WATER-STOP FUNCTION

(71) Applicant: XIAMEN FILTERTECH INDUSTRIAL CORPORATION, Xiamen (CN)

(72) Inventors: Wei-Qiang Xu, Xiamen (CN); Can-Xiang Xu, Xiamen (CN)

(73) Assignee: XIAMEN FILTERTECH INDUSTRIAL CORPORATION, Xiamen (CN)

( * ) Notice: Subject to any disclaimer, the term of this patent is extended or adjusted under 35 U.S.C. 154(b) by 233 days.

(21) Appl. No.: 16/181,218

(22) Filed: Nov. 5, 2018

(65) Prior Publication Data
US 2019/0134539 A1 May 9, 2019

(30) Foreign Application Priority Data
Nov. 8, 2017 (CN) .......................... 201721475409.4

(51) Int. Cl.
*B01D 29/11* (2006.01)
*B01D 35/153* (2006.01)
*C02F 1/00* (2006.01)

(52) U.S. Cl.
CPC ............ *B01D 29/11* (2013.01); *B01D 35/153* (2013.01); *C02F 1/003* (2013.01); *B01D 2201/29* (2013.01); *B01D 2201/34* (2013.01); *C02F 2201/006* (2013.01); *C02F 2307/10* (2013.01)

(58) Field of Classification Search
CPC ............ B01D 2201/29; B01D 2201/34; B01D 29/11; B01D 35/153; C02F 1/003; C02F 2201/006; C02F 2307/10
See application file for complete search history.

(56) References Cited

U.S. PATENT DOCUMENTS

| | | | |
|---|---|---|---|
| 8,398,853 B2 * | 3/2013 | An ....................... | B01D 35/153 210/235 |
| 9,868,081 B1 * | 1/2018 | Zhang ..................... | C02F 1/001 |
| 2007/0284296 A1 * | 12/2007 | Swain ..................... | C02F 9/005 210/235 |
| 2008/0156711 A1 * | 7/2008 | Vitan ................... | B01D 35/306 210/133 |

* cited by examiner

*Primary Examiner* — Dirk R Bass
(74) *Attorney, Agent, or Firm* — Chun-Ming Shih; Best Int'l Patent & trademark

(57) ABSTRACT

A filter cartridge having a double water-stop function, that comprises: a filter cartridge main body, a rotation body, and a water channel main body. The filter cartridge main body includes: an outer shell body, a filter cartridge, a filter cartridge cover, a first water outlet, a second water outlet, a first compression spring, a second compression spring, a first tight seal ring, a second tight seal ring, a first water input port, a second water input port, a first water outlet channel, and a second water outlet channel. The rotation body includes: a first water channel, a second water channel, a third water channel. The water channel main body includes: a first water input hole, a first water output hole, and a second water output hole.

4 Claims, 6 Drawing Sheets

FILTER CARTRIDGE HAVING DOUBLE WATER-STOP FUNCTION

BACKGROUND OF THE INVENTION

Field of the Invention

The present invention relates to a filter cartridge, and in particular to a filter cartridge having a double water-stop function.

The Prior Arts

With the raise of living standard, people are paying more attention to the quality of life, and particularly to the field of clean and safe drinking water. For this purpose, water filtering devices are installed in most of the households. The water filtering device includes a filter cartridge and a main body. For this device, the filter cartridge can be detached and replaced. Yet, presently, the filter cartridge is not designed to have water stoppage capability. As such, when the filter cartridge is detached, the water remaining in the filter cartridge tends to leak out, to make the floor damp and dirty, thus causing the user quite inconvenience.

Therefore, presently, the design and performance of the water filtering device is not quite satisfactory, and it leaves much room for improvement.

SUMMARY OF THE INVENTION

In view of the problems and drawbacks of the prior art, the present invention provides a filter cartridge having a double water-stop function that comprises: a filter cartridge main body, a rotation body, and a water channel main body.

The filter cartridge main body includes: an outer shell body, disposed around and encircling the filter cartridge main body; a filter cartridge, disposed inside the outer shell body; a filter cartridge cover, to work in cooperation with the filter cartridge; a first water outlet, disposed at one end of a first water outlet channel; a second water outlet, disposed at one end of the second water outlet channel; a first compression spring, disposed between a water input end of the first water outlet and the filter cartridge cover; a second compression spring, disposed between a water input end of the second water outlet and the filter cartridge cover; a first tight seal ring, disposed around the water input end of the first water outlet, to work in cooperation with a perimeter wall of a water output end of the first water outlet; a second tight seal ring, disposed around the water input end of the second water outlet, to work in cooperation with a perimeter wall of a water output end of the second water outlet; a first water input port, disposed between the first tight seal ring, and the water output end of the first water outlet on the perimeter wall of the first water outlet; a second water input port, disposed between the second tight seal ring, and the water output end of the second water outlet on the perimeter wall of the second water outlet; a first water outlet channel, disposed in the first water outlet, and is connected to and in communication with first water input port; a second water outlet channel, disposed in the second water outlet, and is connected to and in communication with second water input port.

The rotation body includes: a first water channel, disposed in the rotation body, to work in cooperation with a water inlet of the filter cartridge main body; a second water channel, disposed in the rotation body, to work in cooperation with the first water outlet of the filter cartridge main body, a center line of a water output hole of the second water channel coincides with a rotation axis of the rotation body, and a first crutch shape water passage channel is disposed at a water output end of the second water channel; a third water channel, disposed in the rotation body, to work in cooperation with the second water outlet of the filter cartridge main body, and a second crutch shape water passage channel is disposed at a water output end of the third water channel.

The water channel main body includes: a first water input hole, disposed in the water channel main body, to work in cooperation with the first water channel, a first water output hole, disposed in the water channel main body, to work in cooperation with the second water channel, a center line of the first water output hole is separate from the rotation axis of the rotation body; and a second water output hole, disposed in the water channel main body, to work in cooperation with the third water channel.

In an aspect of the present invention, at an end portion of the water input end for the first water outlet is disposed a first indent slot, one end of the first compression spring is disposed in the first indent slot.

In another aspect of the present invention, at an end portion of the water input end for the second water outlet is disposed a second indent slot, one end of the second compression spring is disposed in the second indent slot.

In a further aspect of the present invention, the filter cartridge having a double water-stop function further includes a check valve, disposed between a water output end of a water input port for the outer shell body, and a water input end of a water input port for the filter cartridge cover.

Compared with the existing technology, the filter cartridge having a double water-stop function of the present invention has the advantages that: in detaching the filter cartridge, the water remaining in the filter cartridge and water channel is kept from flowing out, to protect the normal function of the product, and raise it convenience of usage. In addition, the structure of the present invention is simple and compact, so that it can be assembled easily.

Further scope of the applicability of the present invention will become apparent from the detailed descriptions given hereinafter. However, it should be understood that the detailed descriptions and specific examples, while indicating preferred embodiments of the present invention, are given by way of illustration only, since various changes and modifications within the spirit and scope of the present invention will become apparent to those skilled in the art from the detail descriptions.

BRIEF DESCRIPTION OF THE DRAWINGS

The related drawings in connection with the detailed descriptions of the present invention to be made later are described briefly as follows, in which.

DETAILED DESCRIPTION OF THE PREFERRED EMBODIMENT

The purpose, construction, features, functions and advantages of the present invention can be appreciated and understood more thoroughly through the following detailed descriptions with reference to the attached drawings.

Figure 1:
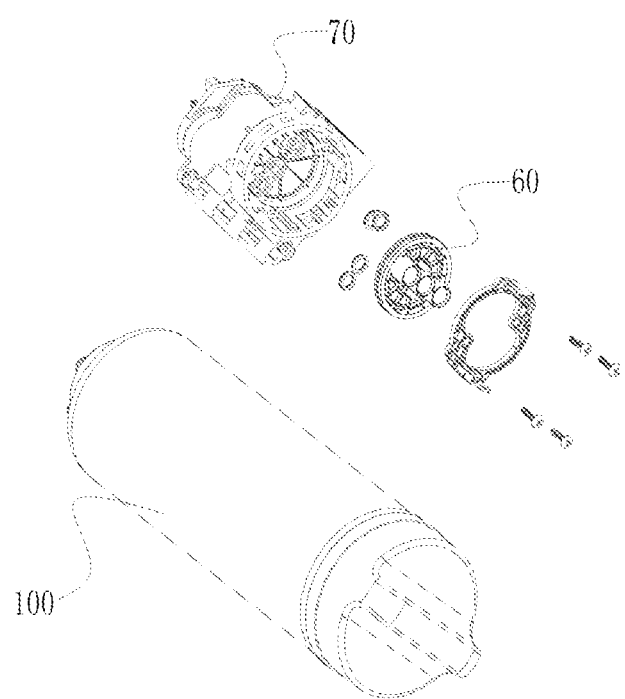
FIG. 1 is an exploded view of a filter cartridge having a double water-stop function according to the present invention.
Figure 2:
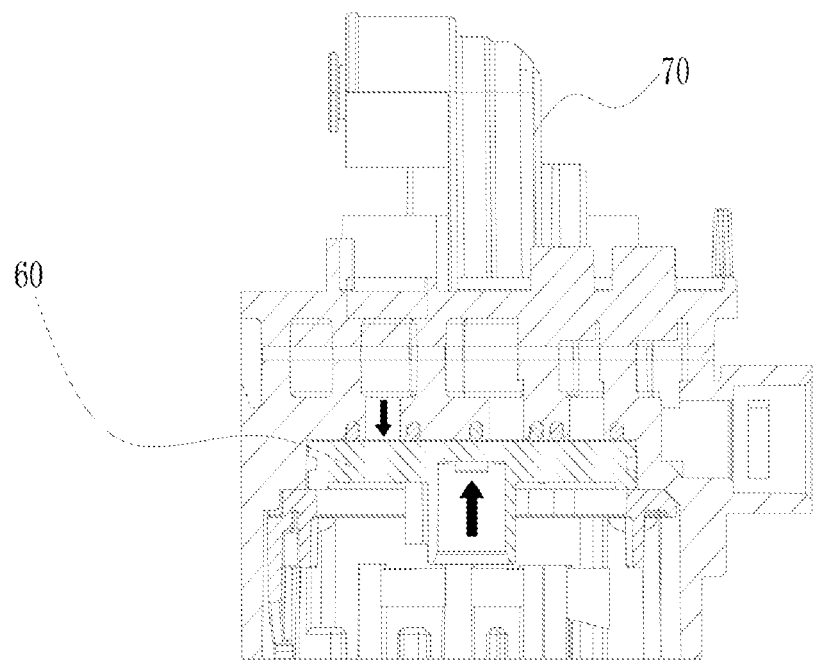
FIG. 2 is a schematic diagram of a filter cartridge having a double water-stop function in a water-stop state according to the present invention.
Figure 3:
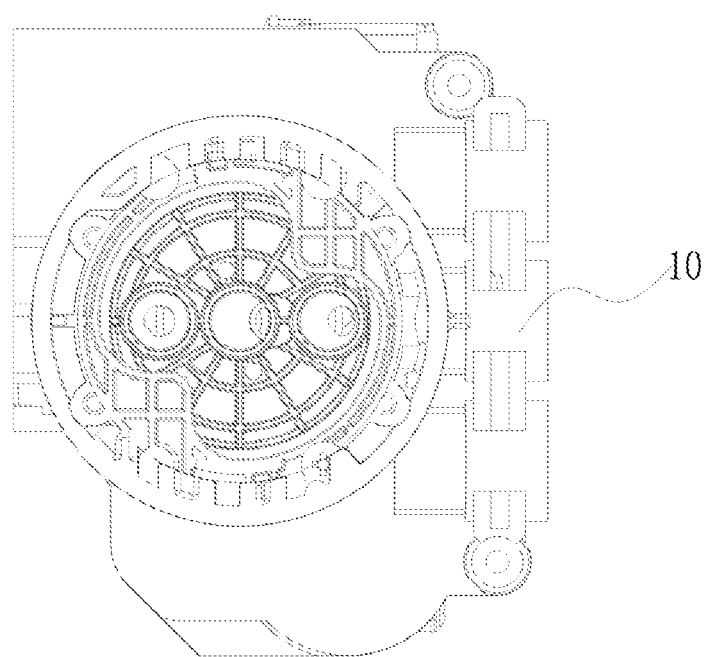
FIG. 3 is a schematic diagram of a filter cartridge having a double water-stop function in a water-flow state according to the present invention.
Figure 4:
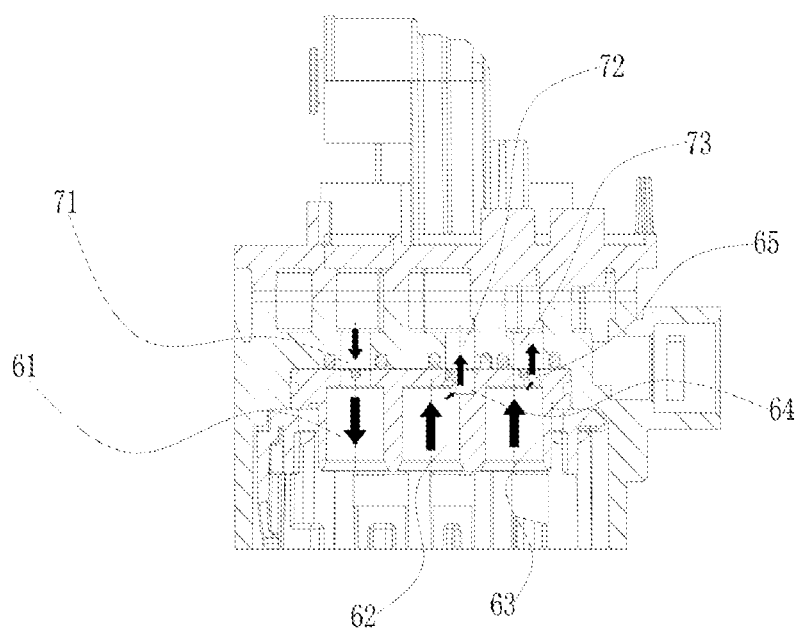
FIG. 4 is another schematic diagram of a filter cartridge having a double water-stop function in a water-flow state according to the present invention.
Figure 5:
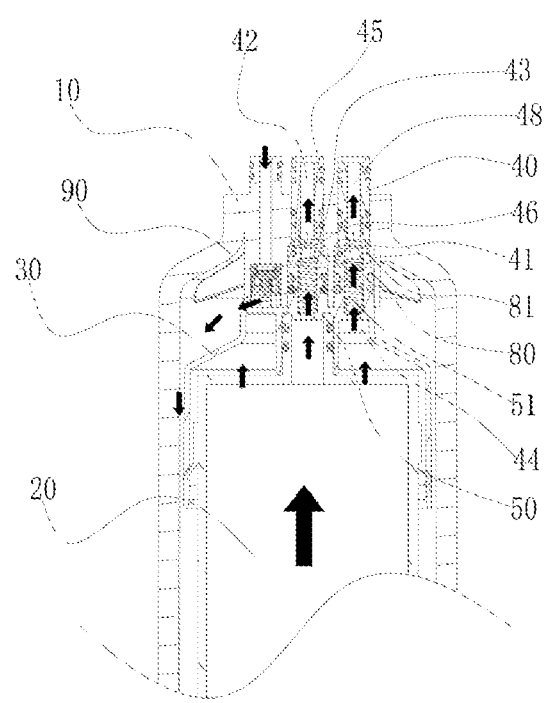
FIG. 5 is a schematic diagram of a filter cartridge main body in a water-flow state according to the present invention.
Figure 6:
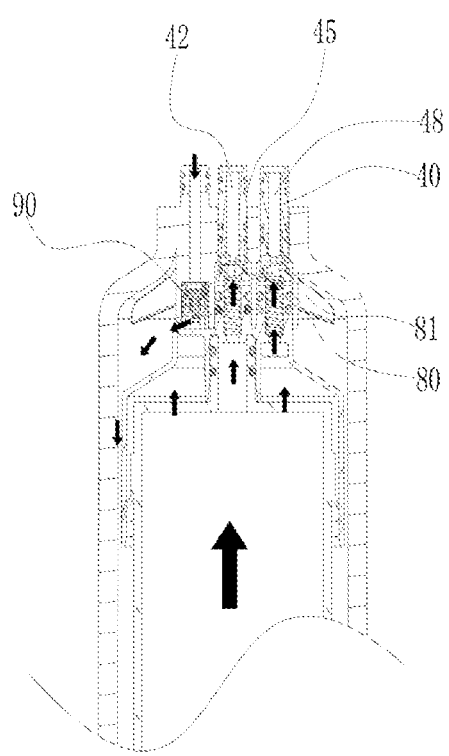
FIG. 6 is a schematic diagram of a filter cartridge main body in a water-stop state according to the present invention.

Refer to FIGS. 1 to 6 respectively for an exploded view of a filter cartridge having a double water-stop function according to the present invention; a schematic diagram of a filter cartridge having a double water-stop function in a water-stop state according to the present invention; a schematic diagram of a filter cartridge having a double water-stop function in a water-flow state according to the present invention; another schematic diagram of a filter cartridge having a double water-stop function in a water-flow state according to the present invention; a schematic diagram of a filter cartridge main body in a water-flow state according to the present invention; and a schematic diagram of a filter cartridge main body in a water-stop state according to the present invention.

As shown in FIGS. 1 to 6, the present invention provides a filter cartridge having a double water-stop function that comprises: a filter cartridge main body 100, a rotation body 60, and a water channel main body 70.

The filter cartridge main body 100 includes: an outer shell body 10, disposed around and encircling the filter cartridge main body 100; a filter cartridge 20, disposed inside the outer shell body 10; a filter cartridge cover 30, to work in cooperation with the filter cartridge 20; a first water outlet 45, disposed at one end of a first water outlet channel 42; a second water outlet 40, disposed at one end of the second water outlet channel 48; a first compression spring 50, disposed between a water input end of the first water outlet 45 and the filter cartridge cover 30; a second compression spring 51, disposed between a water input end of the second water outlet 40 and the filter cartridge cover 30; a first tight seal ring 80, disposed around the water input end of the first water outlet 45, to work in cooperation with a perimeter wall of a water output end of the first water outlet 45; a second tight seal ring 81, disposed around the water input end of the second water outlet 40, to work in cooperation with a perimeter wall of a water output end of the second water outlet 40; a first water input port 46, disposed between the first tight seal ring 80, and the water output end of the first water outlet 45 on the perimeter wall of the first water outlet 45; a second water input port 41, disposed between the second tight seal ring 81, and the water output end of the second water outlet 40 on the perimeter wall of the second water outlet 40; a first water outlet channel 42, disposed in the first water outlet 45, and is connected to and in communication with first water input port 48; a second water outlet channel 48, disposed in the second water outlet 40, and is connected to and in communication with second water input port 41.

The rotation body 60 includes: a first water channel 61, disposed in the rotation body 60, to work in cooperation with a water inlet of the filter cartridge main body 100; a second water channel 62, disposed in the rotation body 60, to work in cooperation with the first water outlet 45 of the filter cartridge main body 100, a center line of a water output hole of the second water channel 62 coincides with a rotation axis of the rotation body 60, and a first crutch shape water passage channel 64 is disposed at a water output end of the second water channel 62; a third water channel 63, disposed in the rotation body 60, to work in cooperation with the second water outlet 40 of the filter cartridge main body 100, and a second crutch shape water passage channel 65 is disposed at a water output end of the third water channel 63.

The water channel main body 70 includes: a first water input hole 71, disposed in the water channel main body 70, to work in cooperation with the first water channel 61; a first water output hole 72, disposed in the water channel main body 70, to work in cooperation with the second water channel 62, a center line of the first water output hole 72 is separate from the rotation axis of the rotation body 60; and a second water output hole 73, disposed in the water channel main body 70, to work in cooperation with the third water channel 63.

In the present invention, at an end portion of the water input end for the first water outlet 45 is disposed a first indent slot 43, one end of the first compression spring 50 is disposed in the first indent slot 43.

In the present invention, at an end portion of the water input end for the second water outlet 40 is disposed a second indent slot 44, one end of the second compression spring 51 is disposed in the second indent slot 44.

In the present invention, the filter cartridge having a double water-stop function further includes a check valve 90, disposed between a water output end of a water input port for the outer shell body 10, and a water input end of a water input port for the filter cartridge cover 30.

When in the water-flow state, the axis of the first water output 45 does not coincide with that of the second water channel 62. Also, the axis of the second water output hole 73 does not coincide with that of the center line of third water channel 63.

When in the water-flow state, the first water channel 61 is connected to and in communication with the first water input hole 71, the second water channel 62 is connected to and in communication with the first water output hole 72; and the third water channel 63 is connected to and in communication with the second water output hole 73. When it is required to detach the filter cartridge main body 100, all the holes mentioned above are not in communication, to realize a water-stop state.

The implementation of the present invention is described as follows:

As shown in FIGS. 1 to 6, when the first water outlet 45 is pressed by a force from outside, it moves downward, at this time the filter cartridge having a double water-stop function is in a water-flow state. Then, water flows in from the first water input port 46 of the outer shell body 10, and the water passes through the check valve 90 and flows to the bottom portion of the outer shell body 10. After being filtered by the filter cartridge 20, the water is branched into two routes (one for pure water, the other is for waste water), and flows to the filter cartridge cover 30. At this time, since the first water outlet 45 is pressed downward, so a gap is formed between the first water outlet 45 and the outer shell body 10. Then, the water of the two routes flow respectively through the gap between the lower end of the first water outlet 45 and the outer shell body 10, to the first water input port 46 of the first water outlet 45. Subsequently, the water flows through the first water outlet channel 42 of the first water outlet 45, to form a complete water route to realize the water-flow state.

For the water-stop state, as shown in FIGS. 1 to 6, when detaching the entire filter cartridge 20, the top portion of the first water outlet 45 is not subject to force, and a first compression spring 50 is disposed at the bottom portion of the first water outlet 45. Then, under the action of the resilience force of the first compression spring 50, the first water outlet 45 is pushed out, the water is blocked by the first tight seal ring 80 and the side wall of the outer shell body 10, to realize the water-stop state. As such, as shown in the drawings, the first water outlet 45 is pushed upward by the elastic force of the first compression spring 50. At this time, the gap between the first water outlet 45 and the outer shell body 10 is blocked and sealed by the first tight seal ring 80 on the first water outlet 45, and the slant face of the hole in the outer shell body 10, to block the water route, in achieving the water-stop state. In addition, a check valve 90 is disposed at the first water input port 46 of the outer shell body 10, to prevent water from leaking out, to realize effective water blocking.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. A filter cartridge comprising:
   a filter cartridge main body, including:
      an outer shell body, disposed around and encircling the filter cartridge main body,
      a filter cartridge, disposed inside the outer shell body,
      a filter cartridge cover, to work in cooperation with the filter cartridge,
      a first water outlet, for axial sliding in conjunction with the outer shell body,
      a second water outlet, for axial sliding in conjunction with the outer shell body,
      a first compression spring, disposed between a water input end of the first water outlet and the filter cartridge cover, and in tandem directed toward the first water outlet,
      a second compression spring, disposed between a water input end of the second water outlet and the filter cartridge cover, and in tandem directed toward the second water outlet,
      a first tight seal ring, disposed around the water input end of the first water outlet, to work in cooperation with a perimeter wall of a water output end of the first water outlet,
      a second tight seal ring, disposed around the water input end of the second water outlet, to work in cooperation with a perimeter wall of a water output end of the second water outlet,
      a first water input port, disposed between the first tight seal ring, and the water output end of the first water outlet on the perimeter wall of the first water outlet,
      a second water input port, disposed between the second tight seal ring, and the water output end of the second water outlet on the perimeter wall of the second water outlet,
      a first water outlet channel, disposed independently of the first water outlet, wherein the first water outlet is disposed at one end of the first water outlet channel, and the first water outlet channel is connected to and in communication with the first water input port, when no force is applied, the first water outlet channel is closed,
      a second water outlet channel, disposed independently of the second water outlet, wherein the second water outlet is disposed at one end of the second water outlet channel, and the second water outlet channel is connected to and in communication with the second water input port, when no force is applied, the second water outlet channel is closed,
   a rotation body, including:
      a first water channel, disposed in the rotation body, to work in cooperation with a water inlet of the filter cartridge main body,
      a second water channel, disposed in the rotation body, to work in cooperation with the first water outlet of the filter cartridge main body, a center line of a water output hole of the second water channel coincides with a rotation axis of the rotation body, and a first crutch shape water passage channel is disposed at a water output end of the second water channel,
      a third water channel, disposed in the rotation body, to work in cooperation with the second water outlet of the filter cartridge main body, and a second crutch shape water passage channel is disposed at a water output end of the third water channel,
      when the first water outlet and the second water channel are cooperating, only water passes through the first water outlet channel; when the first water outlet and the second water channel are out of cooperating, only residual water is present in the first water outlet channel to achieve the minimum volume of residual water,
      when the second water outlet and the third water channel are cooperating, only water passes through the second water outlet channel; when the second water outlet and the third water channel are out of cooperating, only residual water is present in the second water outlet channel to achieve the minimum volume of residual water; and
   a water channel main body, including:
      a first water input hole, disposed in the water channel main body, to work in cooperation with the first water channel,
      a first water output hole, disposed in the water channel main body, to work in cooperation with the second water channel, a center line of the first water output hole is separate from the rotation axis of the rotation body, and
      a second water output hole, disposed in the water channel main body, to work in cooperation with the third water channel.

2. The filter cartridge as claimed in claim 1, wherein at an end portion of the water input end for the first water outlet is disposed a first indent slot, and one end of the first compression spring is disposed in the first indent slot.

3. The filter cartridge as claimed in claim 1, wherein at an end portion of the water input end for the second water outlet is disposed a second indent slot, and one end of the second compression spring is disposed in the second indent slot.

4. The filter cartridge as claimed in claim 1, further comprising: a check valve, disposed between a water output end of a water input port for the outer shell body, and a water input end of a water input port for the filter cartridge cover.

* * * * *